Patented May 26, 1925.

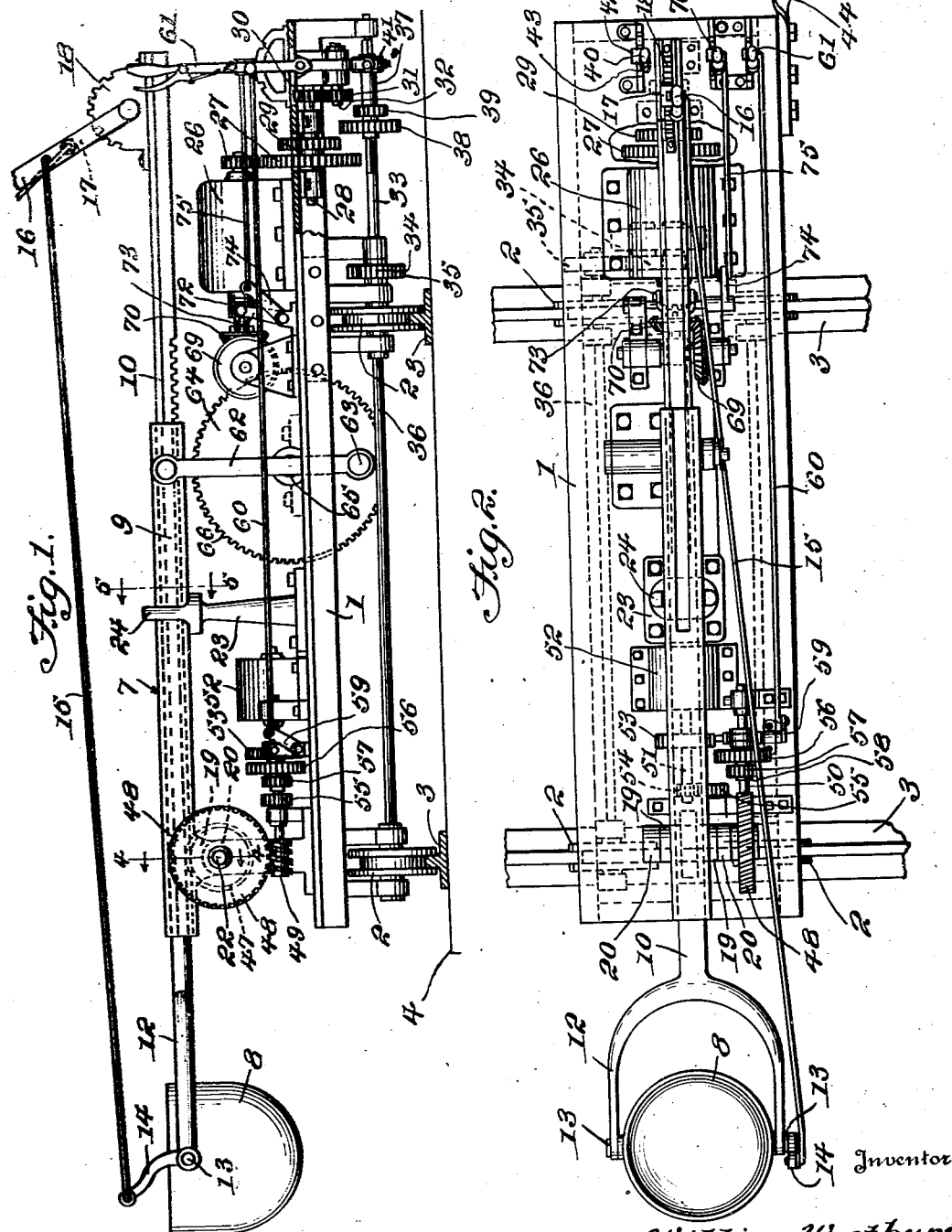

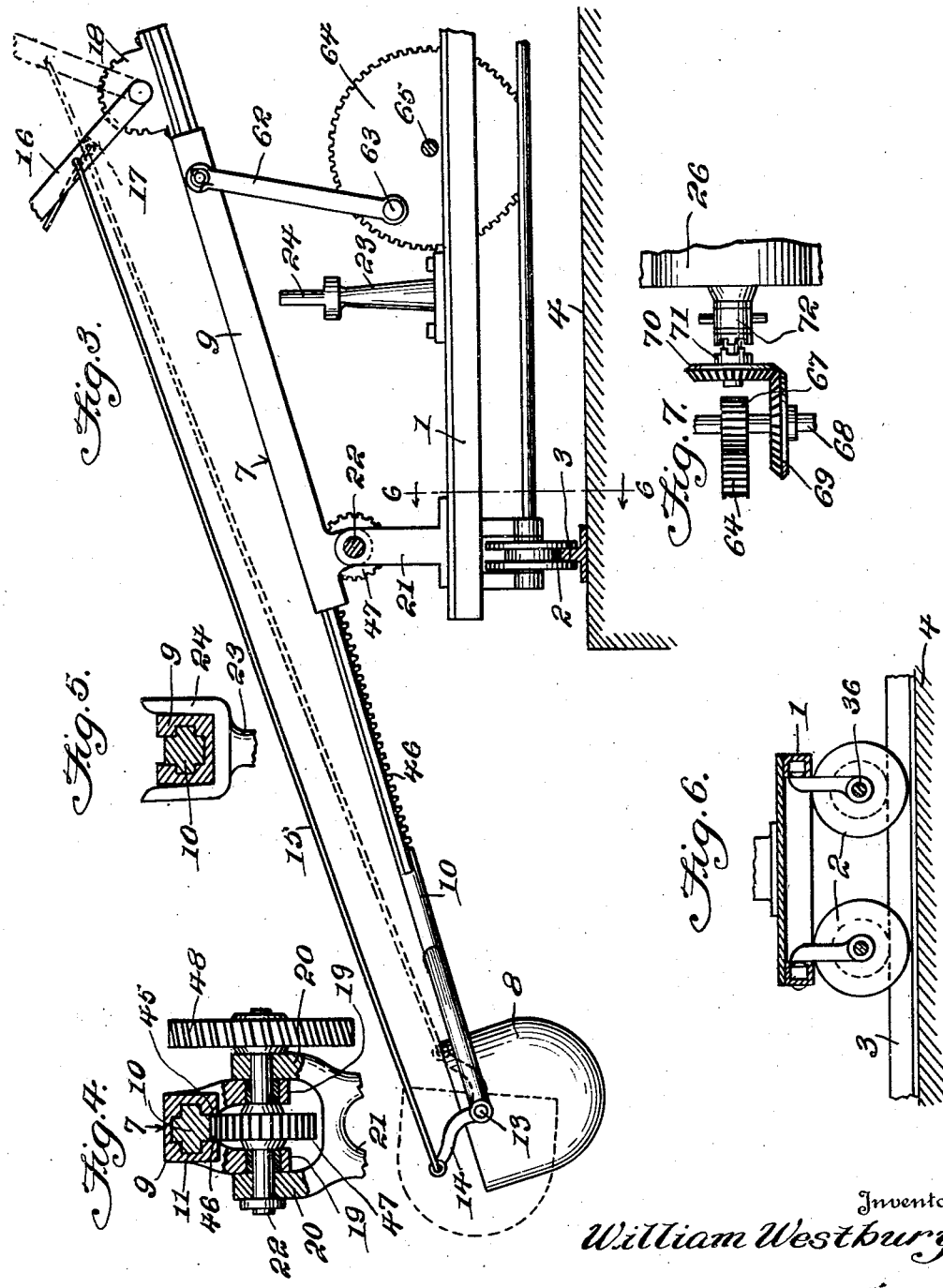

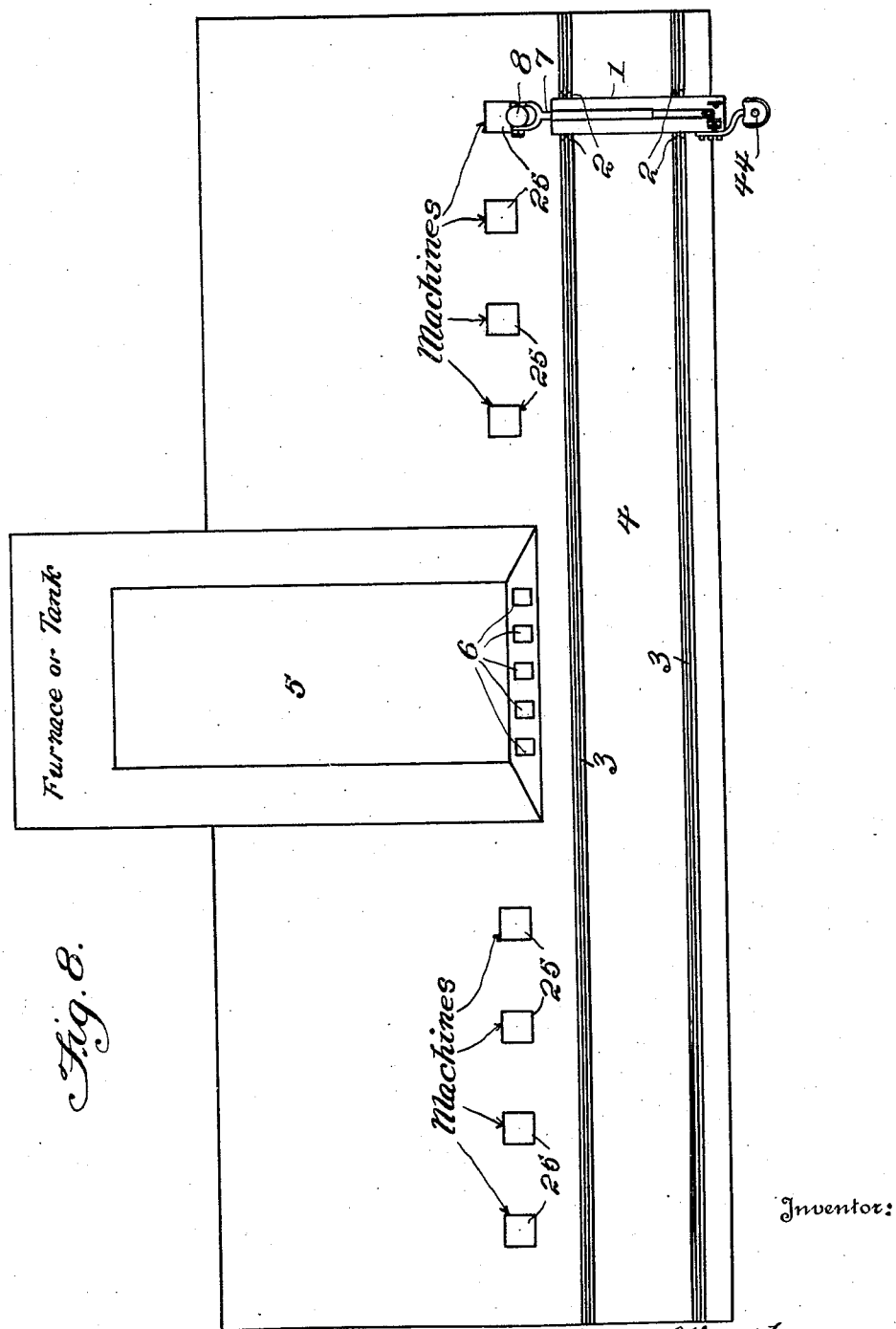

1,539,707

UNITED STATES PATENT OFFICE.

WILLIAM WESTBURY, OF CANASTOTA, NEW YORK, ASSIGNOR TO LAURA ANNA WESTBURY, OF INDEPENDENCE, KANSAS.

GLASS-GATHERING APPARATUS.

Application filed January 28, 1924. Serial No. 689,062.

*To all whom it may concern:*

Be it known that I, WILLIAM WESTBURY, a citizen of the United States, residing at Canastota, in the county of Madison and State of New York, have invented new and useful Improvements in Glass-Gathering Apparatus, of which the following is a specification.

This invention relates to an apparatus for gathering (ladling) glass from a glass melting furnace and transferring the charges of glass drawn from the furnace to suitable receptacles for use. More particularly the invention relates to an apparatus of this character for supplying charges of glass from a tank furnace to glass drawing pots or the like, from which the glass is drawn in the form of cylinders in a well-known way, which cylinders are subdivided and flattened for the production of window glass. The invention may, however, be employed for performing similar operations for any purpose.

One object of the invention is to provide an electrically operated apparatus which enables the ladle to be easily, conveniently and rapidly manipulated for charge gathering movements into and out of the furnace, and which also enables the ladle to be transported and manipulated outside the furnace for deposit of the charge into a suitably situated pot or other receptacle.

Another object of the invention is to provide a ladling apparatus, and associated construction and arrangement of parts in a glass drawing system, whereby the ladle may be employed to supply glass to a plurality of drawing stations arranged on one or both sides of the mouth of the melting furnace, or at other suitable points adjacent thereto.

With these and other objects in view, the invention consists of the features of construction, combination and arrangement of parts, hereinafter fully described and claimed, reference being had to the accompanying drawings, in which:—

Figure 1 is a side elevation, partially in section, of a glass ladling apparatus embodying my invention.

Figure 2 is a top plan view of the same.

Figure 3 is a side view, showing only necessary parts, illustrating the operation of manipulating the ladle.

Figure 4 is a cross-section on line 4—4 of Figure 1.

Figure 5 is a cross-section on line 5—5 of Figure 1.

Figure 6 is a section on line 6—6 of Figure 3.

Figure 7 is a detail view of the gearing for operating the crank gear.

Figure 8 is a diagrammatic plan view showing a preferred arrangement of tank furnace, ladling apparatus and drawing stations.

In carrying my invention into practice, I provide a traveling crane construction comprising a carriage 1 provided with wheels 2 to travel upon track rails 3. These rails are shown as arranged upon a floor or surface 4 and extending parallel with the front of a glass melting tank or furnace 5, provided at the front with one or more openings 6 for the removal of glass therefrom. The surface 4, as disclosed, is arranged in a suitable horizontal plane below the level of the openings 6 in order that the parts of the crane structure may be disposed in proper working relation to said openings, but instead of laying the rails 3 upon such surface 4 they may be supported at a suitable elevation above the openings 6, whenever it is desired to provide for use an overhead crane structure, in which event the wheels 2 will be properly arranged to run upon the overhead rails.

Supported upon the carriage 1 is a crane arm 7 which carries the ladle 8, and which crane arm is of telescopic construction and consists of a supporting head or sleeve member 9 and a rod or bar member 10 extending longitudinally therethrough and projecting beyond opposite ends thereof. The said head or sleeve member 10 is formed to provide a longitudinal guideway 11 in which the rod or bar member 10 is fitted to slide, and the forward end of said rod or bar member is provided with a forked portion 12 which pivotally supports the ladle 8, said ladle having trunnions 13 journaled in the arms of said forked portion. One of these trunnions is provided with a crank arm 14 which is coupled by a connecting rod 15 to a dipper control lever 16 pivotally mounted upon the rear end of the rod or bar member 10, by the backward and forward swinging movements of which lever 16 the ladle 8 may be tilted vertically upon its trunnions, as indicated in dotted lines in Figure 3, for dipping and discharging actions. The lever 16 is provided with a suitably operated dog or pawl 17 to engage the teeth of a rack segment 18, whereby said lever, and consequently the dipper 8, may be held fixed against movement in any position of adjustment.

The head or sleeve member 9 is provided with depending spaced bracket arms 19 which fit between fork arms 20 upon a supporting post or pedestal 21 extending upward from the carriage 1, and passing through said bracket arms 19 and fork arms 20 is a shaft 22 forming a pivotal support for the crane arm whereby said crane arm may be turned as a whole in a vertical plane, this construction adapting the ladle 8 to be raised and lowered to properly position it as required for insertion into and withdrawal from the furnace and for dipping and discharging actions. On the carriage 1 is a second supporting pedestal 23 having a saddled or forked upper end 24 adapted to receive the head portion 9 of the arm 7 to firmly and stably support the crane arm when in normal lowered or horizontal position, as shown in Figure 1.

While the gathering apparatus may be employed for general purposes, it is especially designed, as shown in the present instance, for extracting charges of glass from a tank furnace, as the furnace 5, and conveying the charges of glass to glass pots or other receptacles arranged at glass drawing stations 25. In the present instance two rows of such drawing stations are shown arranged on opposite sides of the front portion of the furnace 5, there being four stations in each row, and the trackway 3 extends past the front of the furnace and the rows of drawing stations 25, so that the gatherer may be employed to dip charges of glass from the furnace and convey the same to the pot or receptacle of any drawing station in either row, and to supply these drawing stations with charges of glass in proper and regular order as required in the operation of such drawing stations. Each drawing station may be of the kind customarily employed for drawing glass cylinders to be used in the manufacture of window glass, including a glass drawing pot, a heating kiln and drawing mechanism of any of the kinds commonly used. The gathering or ladling apparatus is accordingly provided with means for moving it back and forth between the furnace and the series of drawing stations at each side thereof and for manipulating the ladle 8 as required for introducing it into the furnace, gathering a charge of glass from the body of glass therein, withdrawing the filled ladle, transporting it to the desired drawing station and discharging the charge of glass from the ladle into the designated drawing pot.

Mounted upon the carriage 1 is a primary motor 26 of the electric type and which is supplied with electric current in any preferred way. The shaft of this motor is in gear, through intermeshing gear elements 27 with a primary drive shaft 28 carrying gears 29 and 30, the gear 30 meshing with a gear 31 on a stub shaft 32, whereby the gear 31 is driven in a different direction from the gear 29. The gearing described is provided for driving a transmission shaft 33 from the primary drive shaft 28, which shaft 33 communicates motion to the carriage wheels 2 for propelling the carriage along the track 3 in one direction or the other. To this end the shaft 33 is shown as provided with a gear 34 meshing with a gear 35 on a shaft or axle 36 connected to the wheels 2 at one side of the carriage frame. Feathered or otherwise suitably fitted to slide upon and rotate with shaft 33 is a sleeve 37 carrying gears 38 and 39 adjustable by movements of said sleeve to respectively mesh with gears 29 and 31 or to occupy a neutral position therebetween. When sleeve 37 is adjusted to bring gear 38 into mesh with gear 29 the carriage will be driven forwardly or in one direction along the rails 3, while when sleeve 37 is adjusted to bring gear 39 into mesh with gear 31 the motion of the carriage drive gearing will be reversed and the carriage propelled in an opposite or backward direction. When gears 38 and 39 are disposed in a position between gears 29 and 31, as shown in Figure 1, they will be in neutral position with respect to gears 29 and 31 and hence the carriage drive mechanism, with the exception of the primary driving shaft, will be out of operation so that the carriage may stand still in any position along the trackway. A gear control lever 40 is pivotally mounted on the carriage and is suitably coupled, as at 41, to the sleeve 37 so as to adapt the sleeve to be slidably moved thereby while also permitting said sleeve to rotate with the shaft 33 without affecting the lever 40. Said lever 40 is provided with a dog or pawl 42 adapted for engagement of any one of three notches in a rack segment 43 by which the gears may be held in forward or rearward driving or neutral position. Through the mechanism described, which is under convenient control of the operator occupying his seat 44 (the supporting bracket only of which is shown), the gathering apparatus may be propelled to desired positions along the track rails 3 and brought to a state of rest in any working position. If desired, any suitable type of brake mechanism may be employed to act upon the wheels or track rails to hold the carriage fixed against possibility of movement in any working position, but I have not deemed it necessary to show any type of brake mechanism for this purpose, as any ordinary or well known type of brake mechanism may be employed.

The rod or bar member 10 is adapted to be moved backwardly and forwardly in the head or sleeve member 9 of the crane arm for the purpose of advancing or retracting the ladle 8 in the operation of inserting said ladle into the furnace and withdrawing it therefrom and positioning the ladle as required above the drawing pot of a drawing station. To this end, the head or sleeve member 9 is provided in its underside with a slot 45 and the underside of the bar member 10 is provided with rack teeth 46 exposed through said slot for engagement with a gear 47 on the shaft 22, on one end of which shaft is a worm gear 48. As shown, the gear 47 is mounted upon the intermediate portion of shaft 22, between the bracket arms 19, and said gear 47 is mounted concentric with and upon the pivotal axis on which the crane arm is adapted to be tilted, whereby simultaneous tilting motion of the arm as a whole and sliding motion of the rod member 10 within the head or sleeve member 9 may be simultaneously carried out without causing interference. Gear 48 meshes with a worm 49 on a transmission shaft 50. This shaft 50 is arranged in parallel relation to the shaft 51 of a second electric motor 52 arranged at the front of the carriage. On this motor shaft are gears 53 and 54, gear 54 meshing with a suitably supported idler or reverse gear 55. On the shaft 50 are gears 56 and 57 for meshing engagement respectively with gears 53 and 55. These gears 56 and 57 are carried by a sleeve 58, mounted on shaft 50 in a manner similar to the mounting of sleeve 37 on shaft 33, and coupled to this sleeve, in a manner similar to the connection of lever 40 with sleeve 37, is a crank arm or actuating lever 59 coupled by a connecting rod 60 with a control lever 61 whereby the gears 56 and 57 may be shifted backwardly and forwardly. Figures 1 and 2 show the gears 56 and 57 in a neutral position, which position they occupy except when the crane arm gearing of which they form a part is in action for swinging or tilting said crane arm, both gears 56 and 57 being out of mesh with their coacting gears 53 and 55. When sleeve 58 is shifted to bring gear 56 into mesh with gear 53, motion will be communicated to slide the arm or bar 10 forwardly to advance the ladle 8, while when gear 57 is in mesh with gear 55 motion will be communicated to the bar or arm 10 to slide it rearwardly and to thus retract the ladle 8. It will thus be understood that the ladle 8, by means of the gearing thus described, may be moved forwardly or rearwardly to any degree required within the range of movement of bar 10 to position it within or withdraw it from the furnace 5 or to dispose it in proper position above the pot of any drawing station 25, while by means of the lever 16 and its cooperating connections the ladle or dipper 8 may be tilted for gathering and dumping operations and locked in charge holding position. Assuming, therefore, that the gatherer is disposed in front of the furnace, it is obvious that the ladle or dipper may be moved forward through one of the openings 6 into the tank 5 and, after being operated to dip up a charge of glass, may be withdrawn through the opening 6 and the drive gearing then set into motion to move the carriage in either direction to convey the charge of glass to any one of the drawing stations 25 on either side of the furnace.

Mechanism is also provided for tilting or swinging the crane arm 9 on its axis 22 for the purpose of raising and lowering the ladle or dipper 8 within a predetermined working range below its normal horizontal position. This mechanism comprises a link or connecting rod 62 connecting the rear portion of the crane arm with a crank or wrist pin 63 on a crank gear 64 journaled on a shaft or axle 65 mounted on the carriage. The toothed periphery 66 of this gear 64 meshes with a pinion 67 on a transmission shaft 68 carrying a beveled gear 69 meshing with a similar drive gear 70 on the forward end of the shaft of the primary motor 26. The gear 70 is normally loose on the motor shaft and runs idly, and is provided with a clutch sleeve 71 for cooperation with a sliding clutch sleeve 72 on said motor shaft, which sliding clutch sleeve is suitably connected by a crank arm 73 to an actuating arm 74 coupled in turn by a connecting rod 75 to a control lever 76 whereby the gearing described may be thrown into and out of action at will. When the dipper carrying arm 7 is in normal horizontal position as shown in Figure 1, the rod or link 62 stands in a substantially vertical position with the crank pin 63 disposed below the level of shaft 65. The gearing described may, however, be set into action to turn gear 64 and cause an upward movement of the crank pin 63 whereby motion will be communicated through the link 62 to elevate the rear portion of the crane arm 7, thus depressing the front portion of said arm and the ladle or dipper 8. The pin 63 may have a range of motion of 180° or more so that the crane arm and dipper may have a tilting motion to the degree required to raise and lower the dipper to any extent necessary for a proper working action. Suitable means may be provided, such as a dog and a rack, for each lever 61 and 76, whereby said levers and the parts actuated thereby may be locked in different positions for an obvious purpose.

It will be seen from the construction described that the invention provides a ladler or gatherer which is self-propelled for movement along a trackway for gathering glass from a furnace and conveying charges of glass to drawing stations arranged at one or both sides of the furnace. The arrangement of drawing stations at both sides of the furnace, as shown in the present instance, enables one gatherer to be employed successively or in proper order for serving glass to from four to eight stations as required for use in drawing glass cylinders of any length and diameter, or for supplying glass for any other similar or analogous purpose. This working arrangement provides a compact organization of parts which effects a material saving of time and labor in supplying glass from a furnace to a number of drawing stations in a rapid and economical manner. It will further be seen that the invention provides a means whereby the dipper or ladle may be moved into the furnace, depressed and tilted so as to be submerged and take up a charge of glass, then raised and withdrawn from the furnace and held securely supported in charge holding position while the charge is being transported by the motion of the carrier to a designated drawing station, and that upon arrival at a station the dipper may be moved outwardly, raised and lowered and tilted to properly position it above the drawing pot or receptacle at the drawing station and inverted to discharge the charge of glass therein, all of which may be accomplished in a simple, ready and convenient manner by a workman from his position on the seat 44 or other suitable support on the carriage frame or platform. The construction described further adapts the dipper or ladle to be disposed so that it may be heated in the furnace to melt out any aftermath or residuum after each dipping action and to properly heat it for the reception of a succeeding charge without liability of unduly chilling such charge. These and other advantages will be readily understood by those versed in the art without a further and extended description.

Having thus fully described my invention, I claim:—

1. In a gatherer of the character described, the combination of a carriage, a vertically tilting arm mounted on the carriage and comprising telescopic sections, one of said sections being pivotally connected with the carriage at a point between its ends and the other slidably engaging said pivoted section, said slidable section having rack teeth, a ladle carried by the sliding arm section, means including a gear mounted concentric with said pivotal connection and meshing with the rack teeth for sliding said sliding arm section in or out to advance or retract the ladle, and means coupled to said pivotally mounted arm section for tilting said arm in a vertical plane.

2. In a gathering apparatus of the character described, the combination of a traveling carriage, a crane arm mounted on the carriage, said arm comprising a vertically swinging section pivotally mounted on the carriage at a point in advance of its rear end and a sliding section carried thereby, a dipper carried by the sliding section, rack and pinion mechanism including a gear pinion mounted concentric with said pivotal connection for sliding said sliding section in and out to advance or retract the dipper, means coupled to the pivoted section in rear of its pivotal connection for raising and lowering the pivoted section on its pivotal connection, and means for controlling the dipper.

3. In a gathering apparatus of the character described, the combination of a traveling carriage, motor driven means for propelling the carriage, a dipper supporting arm comprising a tilting section pivotally mounted on the carriage and a sliding section engaging said tilting section, said tilting section being pivotally mounted adjacent its forward end, a pivotally mounted dipper carried by the sliding section, means for sliding said sliding section in and out, means for controlling the dipper, and means for imparting tilting motions to the pivoted section of the arm.

4. In a gatherer of the character described, the combination of a traveling carriage, a dipper carrying arm comprising a tilting section pivotally mounted adjacent its forward end on the carriage, and a sliding section movable in said tilting section, a dipper carried by the sliding section, a support for the pivoted arm section adapted to be engaged by the rear portion of said arm section when in normal position, means for sliding said sliding arm section in and out, and means for vertically tilting the pivoted arm section on its pivotal connection.

5. In a gatherer of the character described, the combination of a traveling carriage, a dipper carrying arm comprising a sleeve section and a rod section slidably mounted therein, said sleeve section being pivotally mounted adjacent its forward end on the carriage, gearing supported in part by said pivotal connection for sliding the rod section upon the sleeve section, means for supporting the rear end of said sleeve section when in lowered position, and means applied to said sleeve section for raising and lowering the arm.

6. In a gatherer of the character described, the combination of a traveling carriage, a dipper supporting arm comprising a sleeve section having a guideway provided with a slot in the bottom thereof, and a rod section slidable in said guideway and having rack teeth facing said slot, a pivotal support for the forward end of the sleeve section, means for advancing and retracting the rod section including a gear disposed beneath said slot and engaging said rack teeth, a dipper supported by the rod section, and means coupled to the sleeve section for tilting the arm in a vertical plane.

7. In a gatherer of the character described, the combination of a traveling carriage, a vertically tilting, extensible dipper carrying arm comprising a sleeve section and a rod section sliding therein, said sleeve section being pivotally connected with the carriage at a point between its ends and having a longitudinal slot and said rod section having rack teeth presented at said slot, means for sliding the rod section including a gear mounted concentrically with said pivotal connection and engaging said teeth through said slot, a dipper carried by the rod section, and means applied to the sleeve section in rear of its pivot for vertically tilting the arm.

8. In a gatherer of the character described, the combination of a traveling carriage, a dipper carrying arm comprising a sleeve section and a rod section sliding therein, said sleeve section having a longitudinal slot and said rod section rack teeth presented at said slot, a pivotal support for the sleeve section including a shaft, means for sliding said rod section including a gear mounted on said shaft and meshing with said rack teeth through said slot, a dipper supported by the rod section, and means applied to the sleeve section for vertically tilting the arm.

9. In a gatherer of the class described, the combination of a traveling carriage, a dipper supporting arm including a sleeve section and a rod section sliding therein, said sleeve section having a longitudinal slot and said rod section rack teeth presented at said slot, a pivotal support for the sleeve section including a shaft, a gear on said shaft meshing with said rack teeth through said slot, means for driving said gear in one direction or the other, and means coupled to the sleeve section for vertically tilting the arm.

10. In a gatherer of the character described, the combination of a carriage, a dipper carrying arm comprising a sleeve section and a rod section sliding therein, said sleeve section having a longitudinal slot and said rod section rack teeth presented at said slot, a pivotal support for the forward portion of the sleeve section including a shaft, gearing for sliding the rod section in and out including a gear supported by said shaft and meshing with said rack teeth through said slot, a support for the rear end of the sleeve section when in lowered position, and means applied to the rear end of the sleeve section for raising and lowering the arm, a dipper pivotally supported by the rod section, and means for controlling said dipper.

11. In a gatherer of the character described, the combination of a carriage, a dipper supporting arm comprising telescopically connected sections, one of said sections being pivotally mounted on the carriage and slidably receiving the other, a dipper carried by the sliding section, means for sliding said sliding section longitudinally of the pivoted section, a dipper supported by the sliding section, means for controlling the same, a crank gear, means for operating the same, and a connection between said crank gear and the pivoted arm section for raising and lowering said arm.

12. In a gatherer of the character described, the combination of a wheeled carriage, a dipper supporting arm mounted on the carriage and comprising a pivoted section, and a sliding section fitted therein, a dipper carried by the sliding section, a motor and drive gearing for propelling the carriage, a second motor and gearing for sliding the sliding arm section upon the pivoted arm section, crank mechanism coupled to the pivoted arm section for swinging the arm in a vertical plane, and gearing actuated by the first-named motor for operating said crank mechanism.

13. In a gatherer of the character described, the combination of a wheeled carriage, a dipper supporting arm mounted on the carriage and comprising a pivoted section and a sliding section connected therewith, a dipper carried by the sliding section, means for controlling the same, crank gearing applied to the pivoted arm section for raising and lowering the arm, and motor drive mechanism for propelling the carriage, sliding the sliding arm and actuating said crank gearing at will.

14. In a gatherer of the character described, the combination of a traveling carriage, a dipper supporting arm mounted on the carriage and comprising slidably connected supporting and dipper carrying sections, said supporting section being pivotally mounted at its forward end upon the carriage, a dipper carried by the dipper carrying section, gearing associated with said pivotal connection for advancing and retracting the sliding section of the arm, means upon the carriage for supporting the pivoted section of the arm when in normal position, and crank gearing on the carriage coupled to the pivoted section of the arm for raising and lowering the same.

In testimony whereof I affix my signature.

WILLIAM WESTBURY.